United States Patent [19]
Phillips

[11] Patent Number: 6,078,792
[45] Date of Patent: Jun. 20, 2000

[54] WATER-EXPOSURE PROTECTION FOR A MOBILE RADIO COMMUNICATION DEVICE

[75] Inventor: John C. Phillips, Raleigh, N.C.

[73] Assignee: Ericsson, Inc., Research Triangle Park, N.C.

[21] Appl. No.: 08/928,802

[22] Filed: Sep. 12, 1997

[51] Int. Cl.[7] .................................................. H04B 1/38
[52] U.S. Cl. .......................................... 455/90; 455/550
[58] Field of Search ............................... 455/90, 89, 117, 455/128, 347, 351; 174/523; 429/100; 379/433, 437

[56] References Cited

U.S. PATENT DOCUMENTS

| | | | |
|---|---|---|---|
| 4,225,970 | 9/1980 | Jaramillo et al. | 455/90 |
| 4,920,564 | 4/1990 | Allkins | 379/437 |
| 5,175,873 | 12/1992 | Goldenberg et al. | 455/90 |
| 5,625,688 | 4/1997 | Ford et al. | 379/433 |
| 5,664,015 | 9/1997 | Ford et al. | 379/433 |
| 5,665,485 | 9/1997 | Kuwayama et al. | 429/100 |
| 5,896,453 | 4/1999 | Speaks | 455/90 |

*Primary Examiner*—Dwayne D. Bost
*Assistant Examiner*—Joy Redmon
*Attorney, Agent, or Firm*—Coats & Bennett, P.L.L.C.

[57] ABSTRACT

The present invention relates to water-exposure protection of electronic circuitry within a mobile radio communication device such as a mobile cellular telephone. A water-absorbent packing is disposed around buttons or keys which extend through openings in the housing. The packing is able to absorb several times its volume of water. The water-absorbent packing absorbs the water as it enters the housing, thus stopping the further ingress of water and protecting the electronic components in the housing. Once the water source has been removed, the water absorbed by the material will evaporate restoring the full absorption capacity of the material.

6 Claims, 3 Drawing Sheets

WATER-EXPOSURE PROTECTION FOR A MOBILE RADIO COMMUNICATION DEVICE

FIELD OF THE INVENTION

The present invention relates to mobile radio communication devices and, more particularly to water-exposure protection for electronic circuitry housed within a mobile radio communication device.

BACKGROUND OF THE INVENTION

A portable cellular telephone typically includes a housing which contains a speaker, a microphone, a keypad, a display, and an antenna. A printed circuit board containing the electronic circuitry necessary to perform the functions of the cellular telephone is enclosed within the housing. The housing includes a number of openings for keys and buttons that allow ingress of water if used in a rainy environment. If water does penetrate into the interior of the housing, it may cause damage to the electronic circuits contained within the housing.

In certain markets, such as Japan, it is essential for the phone to be able to operate in the rain with no damage. A number of methods have been used in the past to prevent the entry of water into the housing. For example, one solution which has been tried is to design the buttons to seal tightly against the housing. This solution works fairly well when the buttons are in their normal position, however, is still vulnerable to water intrusion when the buttons are pressed. Another solution which has been tried is to design elaborate seals around any openings for buttons or keys. This solution is generally available only when the phone is originally designed for wet weather service. In cases where an existing design is being modified for new markets with stringent water damage requirements, it is not possible to provide complete protection against water damage without extensive (and expensive) redesign of the product.

A third solution which has been tried in the past is to apply conformal coatings to the electronic circuitry within the housing. Such coatings are expensive and can make it difficult to service or repair the electronics.

Accordingly, there is a need for a new type of water protection for electronic devices, such as cellular phones which can be incorporated into existing designs and yet provide some measure of protection against water in wet weather environments.

SUMMARY OF THE INVENTION

The present invention addresses the problem of providing protection against water intrusion into the housing of an electronic device by utilizing a water-absorbent packing which is able to absorb several times its volume of water. The packing is disposed around openings in the housing to prevent water from reaching the sensitive electronics contained within the housing. Unlike a conventional gasket or seal (which is designed to prevent entry of water into the housing) the water-absorbent packing absorbs any water which may seep past buttons or keys on the phone thus preventing the water from coming into contact with the electronic components. Once the water source has been removed, the water absorbed by the material will evaporate restoring the full absorption capacity of the material.

Based on the foregoing, it is apparent that the primary object of the present invention is to provide water-exposure protection for electronic circuitry contained within the housing of a mobile radio communication device such as a mobile cellular telephone.

Another object of the present invention is to provide water exposure protection for a mobile radio communication device which can be incorporated into existing designs without requiring extensive changes.

A further object of the present invention is to provide a reusable means of limiting water ingress into the housing of a mobile radio communication device by using an absorbent material, wherein any water absorbed by the material when it is exposed to a water source will evaporate when that water source is removed.

Other objects and advantages of the present invention will become apparent and obvious from a study of the following description and the accompanying drawings which are merely illustrative of such invention.

DETAILED DESCRIPTION OF THE INVENTION

Figure 1:
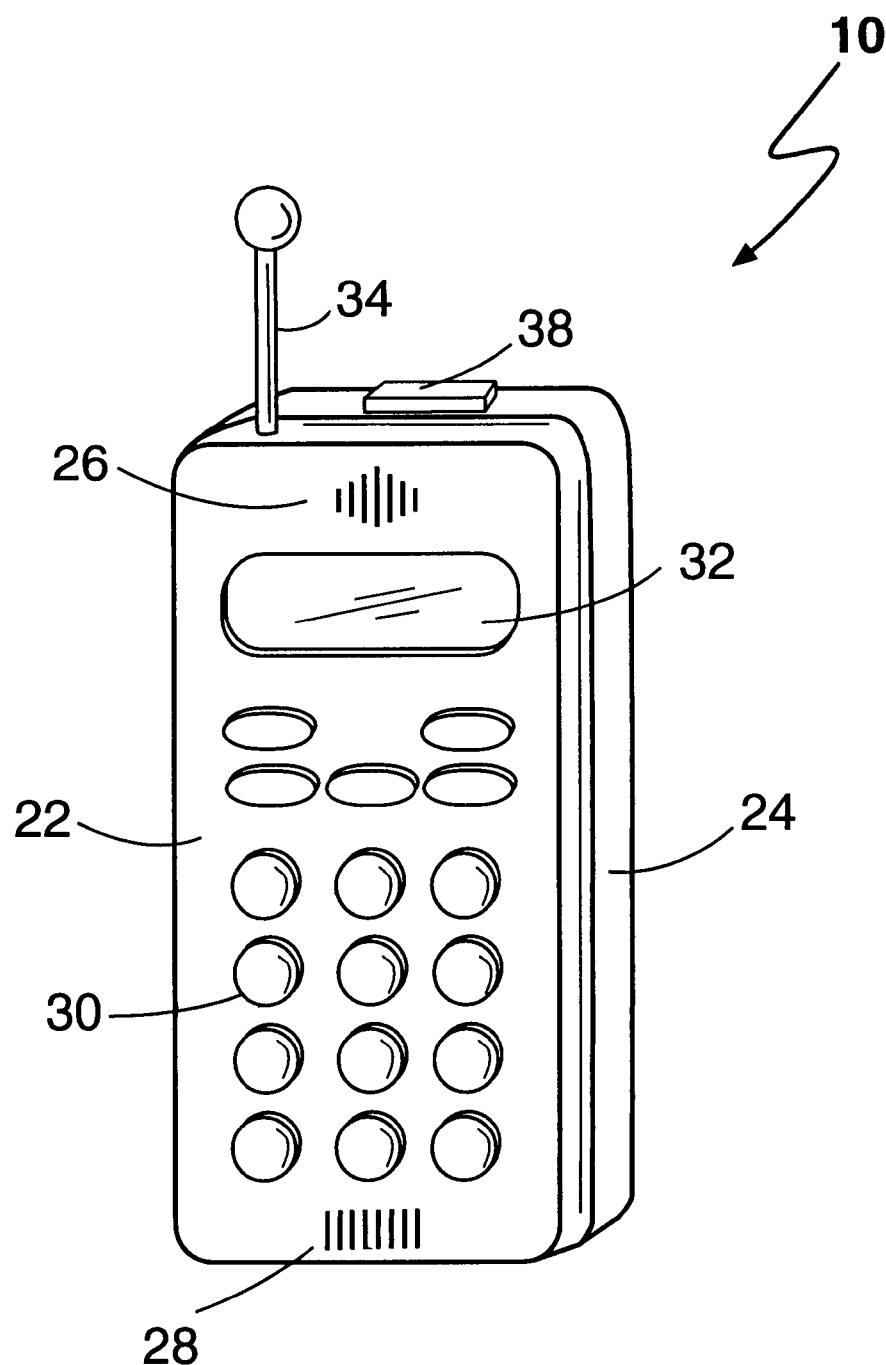
FIG. 1 is a perspective view of a typical mobile cellular telephone.
Figure 2:
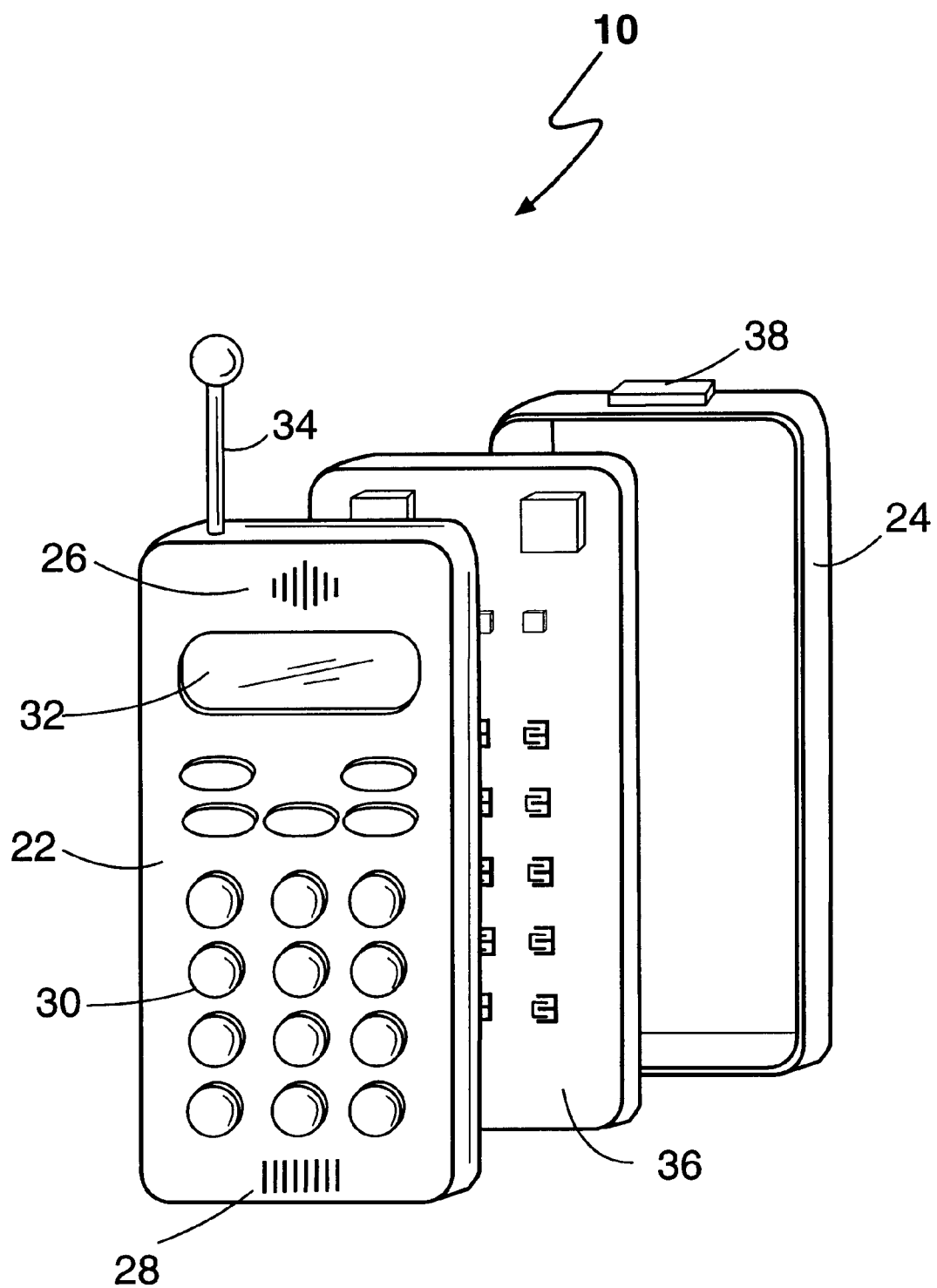
FIG. 2 is an exploded perspective view of a typical mobile cellular telephone showing the housing and printed circuit board containing the electronic circuits.

Referring now to the drawings, particularly FIGS. 1 and 2, a typical handheld cellular telephone is shown and indicated generally by the numeral 10. Telephone 10 generally includes a housing 20 having a front cover 22 and a back cover 24. The front cover 22 of the telephone 10 typically contains a speaker 26, a microphone 28, a keypad 30, and a display 32. The back cover 24 usually includes battery connections for a battery pack (not shown). In the embodiment shown, the back cover also contains a record button which is found on many cellular phones with a record capability. This feature, while not found on all phones, is useful to illustrate the water protection scheme of the present invention. An antenna 34 is disposed between the front cover 22 and back cover 24.

A printed circuit board 36 is contained within the housing 20. The printed circuit board 36 includes transmit and receive circuitry for radio communications, audio processing circuits for coding and decoding voice communications, and a control circuit for controlling the operation of the cellular phone. These elements need to be protected from water entry which might cause damage to the electronic circuits.

The typical cellular telephone 10 contains some provisions to protect the internal electronic components from water damage due to incidental contact with water. For instance, the front cover 22 and the back cover 24 can be provided with interlocking flanges, the openings for the speaker 26 and the microphone 28 can be minimized, and the buttons on the keypad 30, as well as the record button 38, can be made to seal against the housing 20. These steps provide some measure of protection for the telephone against incidental contact with water, for instance in high humidity or light rain. However, there are certain possible water entry points in the housing 20 which can allow even light rain to invade the housing 20 and cause damage. These particular points include the keys on the keypad 30 and the record button 38.

Ordinarily, the keys on the keypad 30 and the record button form a seal with the housing 20 when not actuated. That is, when the buttons are not being pressed by the user, a seal exists between the buttons and the housing 20. However, when the buttons are actuated by the user, the seal between the buttons and the housing 20 is broken, leaving the telephone 10 vulnerable to the ingress of water into the housing 20 from even light rain and resulting damage of the printed circuit board 36. The situation is more critical where the telephone 10 includes the operating button 38 for the recorder/Dictaphone located on top of the housing 20. Since the market for these cellular telephones 10 is worldwide, chances are that these telephones 10 will be used in locales which experience extended periods of adverse weather, for instance the Far East during the monsoon season. Even emergency situations may arise, such as a hurricane, where use of the telephone 10 is necessary out in the weather. Thus, there will be a greater probability of water entering the housing 20 of the telephone 10 and causing damage.

Figure 3:
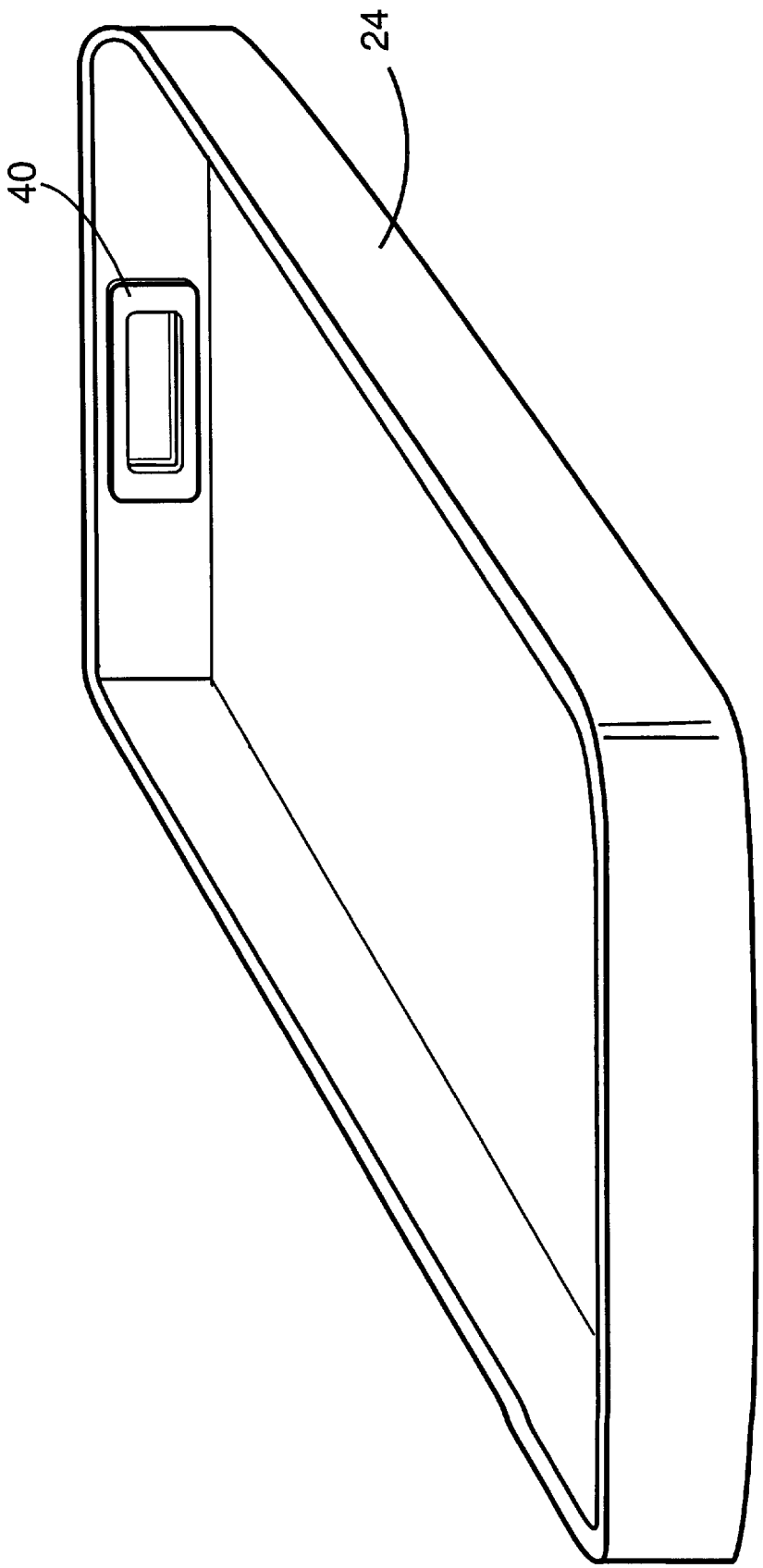
FIG. 3 is a perspective view of the inside of the back cover of the housing showing the water-absorbent packing surrounding an opening for a button.

Referring now to FIG. 3, the water protection scheme of the present invention is shown. The water protection scheme involves surrounding any possible water entry sites in the housing 20 with a water-absorbent packing 40. The water-absorbent packing 40 is preferably disposed on the interior surface of the housing 20 and completely surrounds any opening through which water might enter. As shown in FIG. 3, the packing 40 is disposed around the opening for the record button 38 while allowing the button 38 to operate in a normal manner.

The packing 40 can comprise, for example, compressed cellulose of the type used for disposable ophthalmic surgical spears. This super-absorbent material is capable of absorbing and holding approximately five times its volume in water. The packing 40 is not intended to prevent entry of water into the housing 20 like a conventional gasket or seal. Instead, the present invention provides an additional obstacle to water which may enter the housing 20 that prevents the water or moisture from reaching the electronic components within the housing 20. More specifically, the packing 40 protects the electronic circuitry contained within the housing by absorbing the water as soon as it enters the housing 20. That is, water seeping past any of the keys or buttons is absorbed by the packing 40 upon entry into the housing. To accomplish this result the packing 40 needs to closely conform to the buttons or keys so that the water cannot seep past the packing 40. As long as the packing 40 does not reach its saturation point, water damage to the electronic circuitry can be avoided.

When the phone is subsequently taken to a dry environment where it is not exposed to water, the water absorbed by the packing 40 will be removed by evaporation. Once the water has evaporated from the packing 40, the full absorption capacity of the packing 40 is restored and the full measure of moisture protection for the telephone is available once again.

It is understood that the packing 40 is intended only to provide limited protection from the invasion of water into the housing 20 during normal periods of bad weather. The packing 40 does not provide a water-tight seal. Thus while the packing provides protection against water which might enter the housing 20 during a rainstorm, it will be of little use in case the phone is submerged in water.

In addition to providing greater protection against ingress of water into the housing 20 of the telephone 10, the water-absorbent packing 40 is easily integrated into existing telephone designs. No complex and expensive redesigns of the telephone 10 are necessary. Thus, the present invention provides a simple and cost-effective limited means of protecting the electronic circuitry within the housing of a mobile communication device from damage due to exposure to moisture.

The present invention may, of course, be carried out in other specific ways than those herein set forth without departing from the spirit and essential character of the invention. The present embodiments are, therefore, to be considered in all respects as illustrative and not restrictive, and all changes coming within the meaning and equivalency range of the appended claims are intended to be embraced therein.

What is claimed is:

1. A portable radio communications device, comprising:

a) a housing having an interior surface and an exterior surface;

b) electronic circuitry contained within said housing for performing the functions of the radio communications device;

c) at least one opening through said housing to permit passage of a radio component through said housing; and d) a liquid-absorbing packing constructed of compressed cellulose disposed on said interior surface of housing and adjacent said opening for absorbing liquid that seeps through said opening in said housing, and preventing said liquid from reaching said electronic circuitry.

2. The portable radio communications device of claim 1 wherein said compressed cellulose can absorb approximately 5 times its volume in liquid.

3. The portable radio communication device according to claim 1 wherein said packing surrounds said opening in said housing.

4. A method for protecting electronic circuits in a radio communications device from exposure to water contained within a housing from intrusion of water through openings in said housing comprising:

a) enclosing said electronic circuits in a housing having at least one opening for allowing a component to pass through said housing;

b) forming a packing from a compressed cellulose material; and c) disposing said packing on an interior surface of said housing adjacent said opening so that water seeping into the housing through said opening is absorbed by said packing.

5. The method according to claim 4 further comprising allowing water absorbed by said packing to evaporate through said opening in said housing.

6. The method according to claim 4 wherein said packing is capable of absorbing up to approximately 5 times its volume in liquid.

* * * * *